United States Patent [19]
Briggs

[11] 3,758,075
[45] Sept. 11, 1973

[54] PIVOTALLY MOUNTED FORK EXTENSIONS FOR LOW-LIFT PALLET TRUCKS

[75] Inventor: Richard S. Briggs, Los Altos Hills, Calif.

[73] Assignee: Intergrated Handling Systems, Menlo Park, Calif.

[22] Filed: Apr. 14, 1971

[21] Appl. No.: 133,933

[52] U.S. Cl. .............................. 254/2 R, 214/750
[51] Int. Cl. ............................................. B60p 1/00
[58] Field of Search .......................... 214/620, 750; 254/2 R

[56] References Cited
UNITED STATES PATENTS

| | | | |
|---|---|---|---|
| 3,019,930 | 2/1962 | Allen | 214/750 |
| 3,261,617 | 7/1966 | Becker et al. | 254/29 R |
| 2,795,347 | 6/1957 | Schenkelberger | 214/750 |
| R22,895 | 7/1947 | Clapp | 214/620 |
| 3,392,858 | 7/1968 | Fernstrom et al. | 214/750 |

FOREIGN PATENTS OR APPLICATIONS 1,061,167   3/1967   Great Britain ..................... 214/750

Primary Examiner—Gerald M. Forlenza
Assistant Examiner—Lawrence J. Oresky
Attorney—Townsend & Townsend

[57] ABSTRACT

A low-lift pallet truck of the type having a pair of forks operative to raise pallets a small distance above the ground for transporting including a pair of pivotally mounted fork extension frameworks for raising and transporting at least two adjacent pallets. The fork extensions are rotatable between an upright vertical position to facilitate maneuverability of the truck and an extending horizontal position resting on the forks for simultaneous transportation of adjacent pallets.

4 Claims, 7 Drawing Figures

PATENTED SEP 11 1973 3,758,075
SHEET 1 OF 2
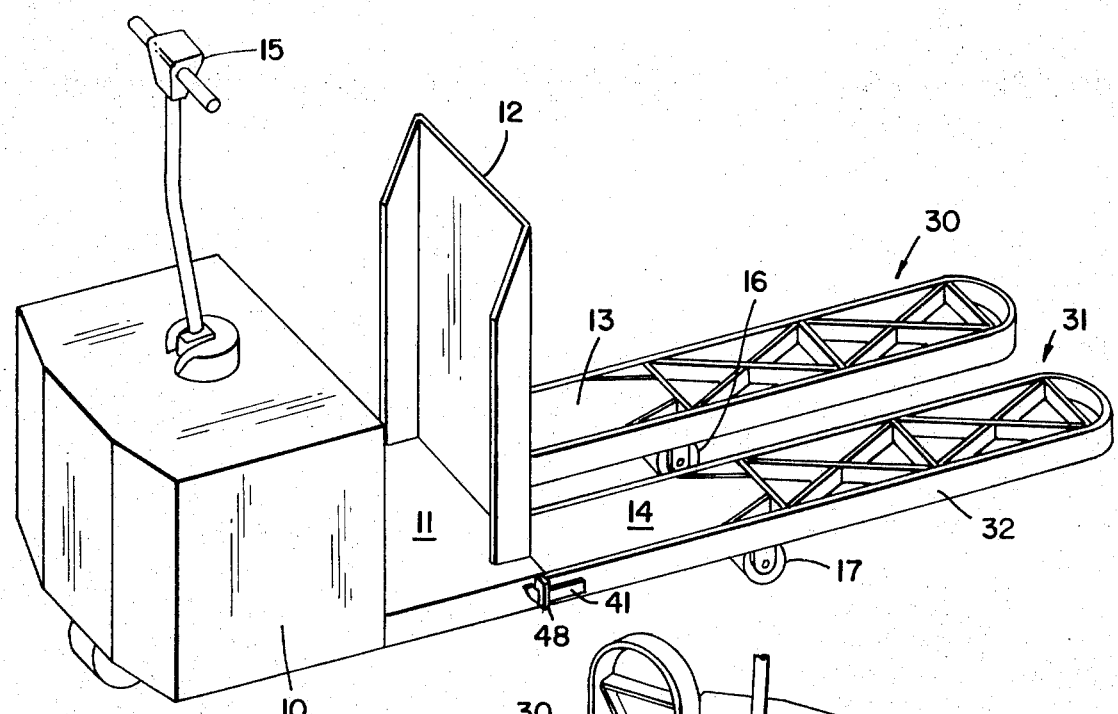
FIG_1
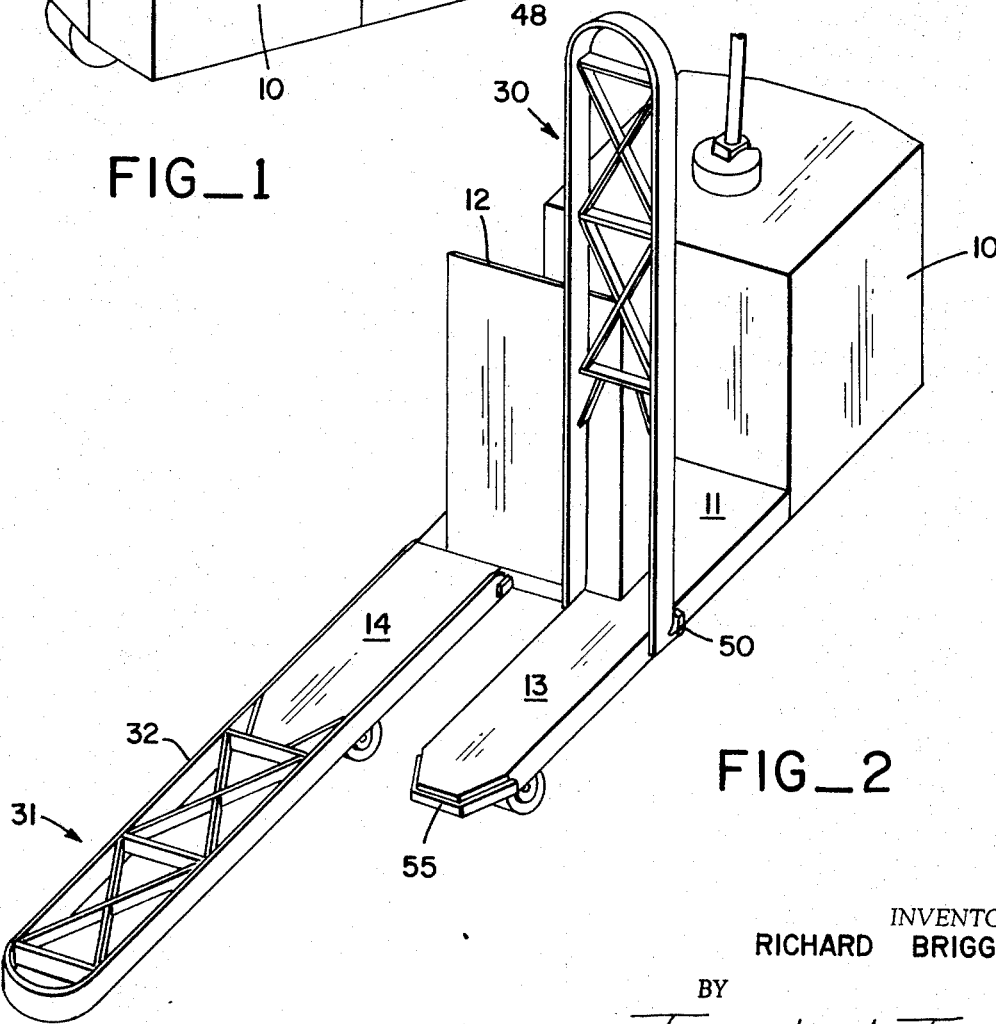
FIG_2
INVENTOR.
RICHARD BRIGGS
BY
*Townsend and Townsend*
ATTORNEYS

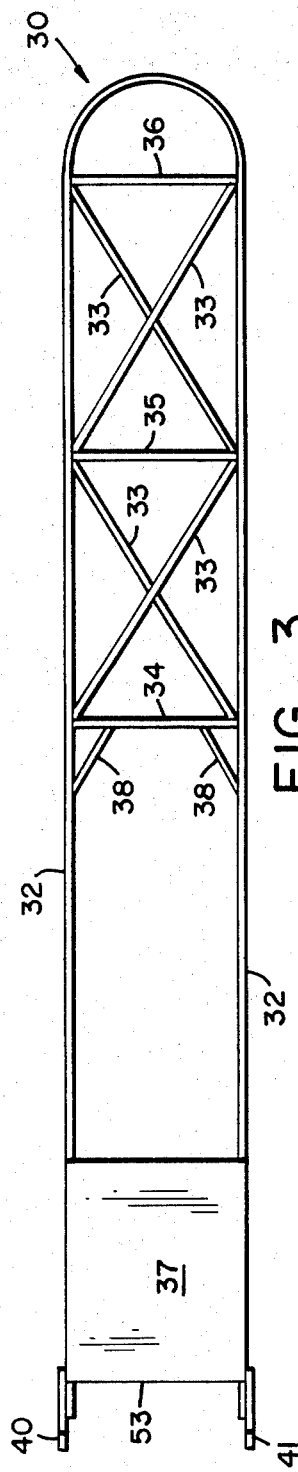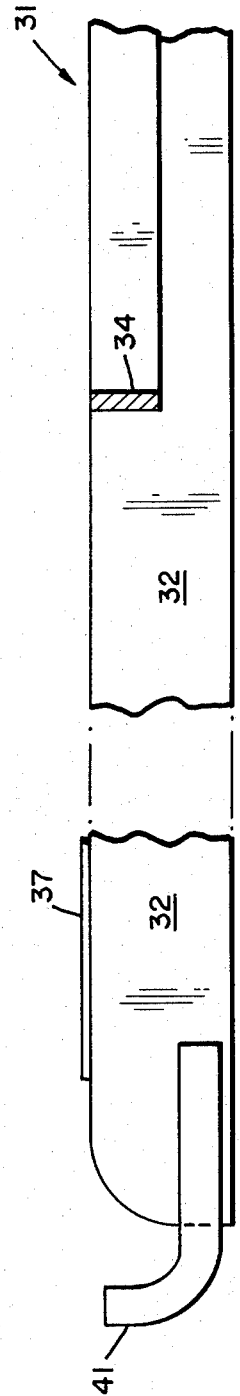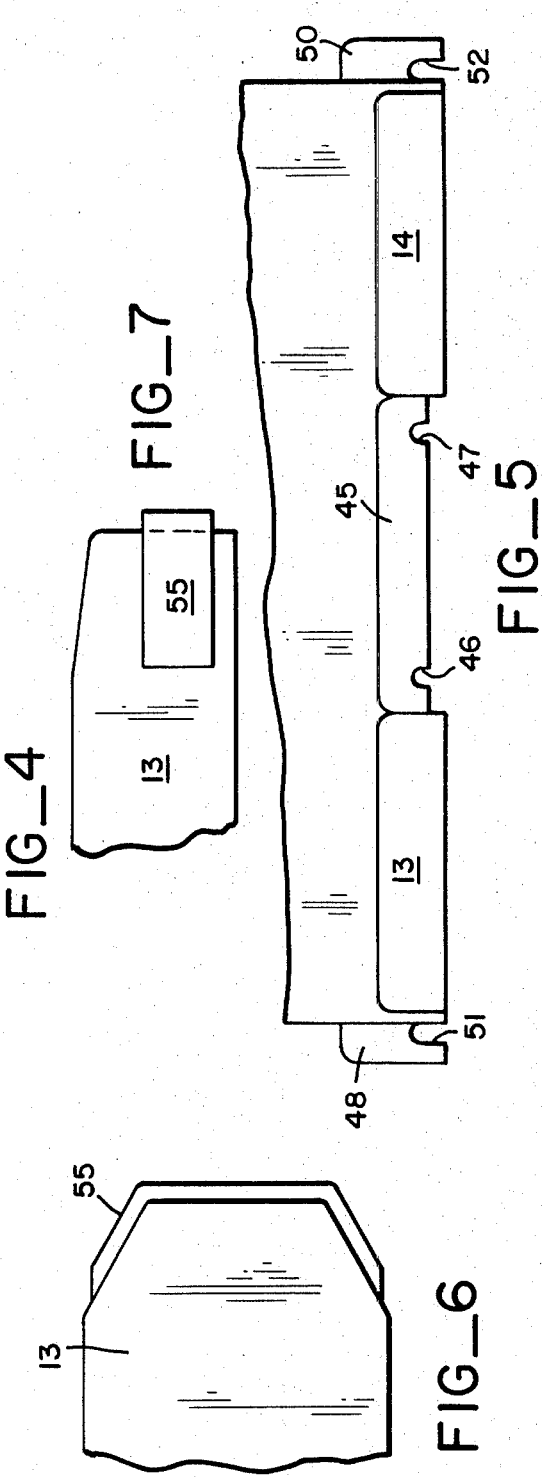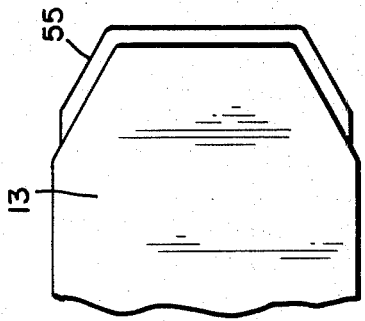

PIVOTALLY MOUNTED FORK EXTENSIONS FOR LOW-LIFT PALLET TRUCKS

This invention relates to a new improvement in low-lift pallet trucks of the type having a pair of forks at one end attached to the transport vehicle and at the other end resting on rollers. The forks are inserted beneath the pallet platform and raised a small distance above the ground on the rollers for lifting and transporting the pallets.

It is an object of the present invention to provide an improved low-lift pallet truck capable of raising and transporting a plurality of adjacent pallets while at the same time permitting maneuverability of the truck or transport vehicle in tight spaces.

In order to accomplish these results the present invention contemplates providing a pair of elongate fork extensions pivotally mounted to the base of the forks to the transport vehicle.

In a preferred embodiment the fork extensions comprise a pair of elongate frameworks each in the form of a rim conforming in width to the outer perimeter of the sides of the forks and extending beyond the forks a length sufficient to raise and transport at least two adjacent pallets. The frameworks are provided with crossbars positioned to rest on and be supported by the conventional forks extending from the vehicle.

A feature and advantage of the present invention is that the fork extension frameworks are pivotally mounted at one end at the base of the forks adjacent the transport vehicle for pivotal movement between an upright vertical position to facilitate maneuverability of the transport vehicle when the fork extensions are not being used, and an extending horizontal position resting on the forks for simultaneous transportation of adjacent pallets.

In the preferred embodiment a bracing strap is provided at the end of each of the conventional forks of the low-lift pallet truck and at least one crossbar of the framework rests on and is supported by the bracing strap. Pivotal mounting is achieved by providing a pair of bent fingers at the end of each framework adjacent the transport vehicle and a support plate across the framework providing a pivotal edge. A complementary attachment plate attached to the base of the truck adjacent the forks is provided with two pairs of indentations one on either side of each fork for receiving the extending fingers of the frameworks. The support plate across the framework resting on the fork provides the actual pivot axis in coopération with the fingers and indentations.

Other objects, features and advantages of the present invention will become apparent in the following specification and accompanying drawings.

FIG. 1 is a perspective view of the improved low-lift pallet transporting vehicle incorporating the pivotally mounted fork extension frameworks of the present invention.

FIG. 2 is a rear view of the low-lift pallet truck with one fork extension in the upright vertical position and the other fork extension in the extending horizontal position.

FIG. 3 is a plan view and FIG. 4 a fragmentary side view of the fork extension frameworks.

FIG. 5 is a rear view of the attachment plate for pivotal mounting.

FIG. 6 is a fragmentary plan view and FIG. 7 a fragmentary side view of the end of a fork with bracing strap affixed.

The low-lift pallet truck incorporating the present invention illustrated in FIGS. 1 and 2 includes the standard low-lift truck transport vehicle 10 having a platform 11 for the vehicle operator and a back brace 12 separating the vehicle operator from pallets carried by the forks 13 and 14. The transport vehicle is driven by a battery operated electric motor with controls 15 operated by the vehicle driver. The forks 13 and 14 extend at one end from the base of the rear of the vehicle 10. The outwardly extending ends of the forks 13 and 14 rest on rollers 16 and 17. The transport vehicle and forks 13 and 14 together constitute a conventional low-lift pallet truck of the type sold under the trade name Walkie & Rider by the Raymond Corporation, Greene, New York. Other models with and without the platform and of various sizes are commercially available.

Using the conventional forks 13 and 14, the low-lift pallet truck is operated by rolling the forks below the upper platform of the pallet with the rollers extending to and resting on the ground. The forks 13 and 14 are mechanically raised a small distance so that the pallet with its load is raised a small distance above the ground, the rollers 16 and 17 resting on the ground. The pallet with its load can thereby be transported by the vehicle around the warehouse or other location.

According to the present invention the low-lift pallet truck is provided with a pair of fork extensions 30 and 31 formed by elongate frameworks pivotally mounted to the base of the rear of vehicle 10 as hereinafter more fully described. As shown in FIG. 1 the fork extension frameworks are constructed and arranged to expand the carrying capacity of the vehicle to permit two or more adjacent pallets to be transported at the same time. The fork extension frameworks 30 and 31 thereby effectively increase the operative length of the conventional forks 13 and 14. On the other hand as shown in FIG. 2 the fork extension frameworks can be pivotally raised to an upper position for removal, or to an upper vertical position when not in use to permit maneuvering of the vehicle in small spaces.

The fork extension framework 30 is illustrated in more detail with reference to figures 30 and 31. The framework consists of an elongate rim 32 having a width conforming to the outer edges of the sides of the forks so that the framework can fit flush over the forks 13 and 14. At its outer end the rim 32 of the framework is spanned by truss bracing which includes structural diagonal cross pieces 33, crossbars 34, 35, and 36 and struts 38. At its other end the rim 32 is fitted with a cross plate 37 across the top of the rim. The framework rests on and pivots on the edge 53 of cross plate 37 during rotation. At the ends of the rim 32 adjacent cross plate 37 are a pair of bent rods or fingers 40 and 41 which function with the cross plate 37 to pivotally mount the framework in cooperation with a fork attachment plate hereinafter described. As shown more clearly with reference to FIG. 4 the diagonal cross pieces 33 and crossbars 34, 35, and 36 are formed with a height approximately half that of the rim 32 so that the cross pieces and crossbars when fixed in position occupy only approximately the upper half of the height of the rim 32.

In order to provide for pivotal mounting of the fork extension frameworks 30 and 31 to the low-lift truck, fork extension attachment plates are provided at the base of the rear of vehicle body 10 on either side of the forks 13 and 14. The attachment plate 45 is mounted intermediate the forks 13 and 14 and is provided with indentations 46 and 47 adjacent the inner sides of forks 13 and 14 respectively. Attachment plates 48 and 50 are attached at the outsides of forks 13 and 14 respectively and are provided with indentations 51 and 52 respectively adjacent the outer edge of each of the forks 13 and 14. By this arrangement the bent rods or fingers 40 and 41 formed at the end of rim 32 can be inserted in the identations 51 and 46 around fork 13 and indentations 47 and 52 around fork 14. With the fork extensions in the upright or vertical position, the fork extensions rests on the lower edge 53 of plate 37 formed across the rim 32 of the framework 30 so that edge 53 forms a pivotal edge in cooperation with the guiding action of fingers 40 and 41 operating within the indentations of the attachment plates heretofore described. A safety catch can be provided to hold the frameworks in the vertical position.

In order to place the fork extension framework in the extending horizontal position, the framework is pivoted downwardly on edge 53 until the entire plate 37 rests on top of one of the respective forks 13 and 14. The framework further rests against the fork on crossbar 34 and struts 38 as shown with reference to FIGS. 6 and 7. As shown in those figures, the conventional fork 13 terminates at its end in a metal brace or bracket 55 welded against the shaped end of the fork and below the upper edge of the fork. The crossbar 34 and struts 38 of the framework are constructed and arranged to conform to the shape or perimeter of the outer end of the conventional fork to thereby rest on the metal brace or strap 55 providing further support for the framework. At the same time, the bent rods or fingers 40 and 41 of the framework bracingly support the framework against the attachment plate described in FIG. 5. In the horizontal position fingers 40 and 41 in the respective indentations, hold the frameworks in place.

In operating the improved low-lift pallet truck for transporting a plurality of adjacent pallets the frameworks are placed in the horizontal extending position and the forks are rolled below the upper platforms of a plurality of at least two adjacent pallets. The upper surfaces of the conventional forks including the attachment plates are then raised which also raises the fork extending frameworks to lift adjacent pallets for transport by the low-lift truck.

It is apparent that the fork extending framework, its rim, crossbar, cross pieces and struts have been constructed and arranged to fit over conventional shaped forks 13 and 14 with the upper edge of the rim conforming with the upper surface with the conventional forks. It is also apparent that the framework structure can be modified within the context of the present invention to cooperate with other shaped forks in achieving the improved result.

What is claimed is:

1. In low-lift pallet trucks of the type comprising a transport vehicle having a pair of forks at one end attached to the transport vehicle and at the other end resting on rollers including lift means operative to raise the forks a small distance above the ground for raising and transporting pallets into which the forks are inserted, the improvement comprising:

a bracing strap at the end of each of the forks;

a pair of elongate fork extension frameworks each comprising a rim conforming with the outer perimeter of the sides of the forks, each said framework having a portion projecting beyond the forks a length sufficient to raise at least two adjacent pallets, each said framework having at least one crossbar spanning said rim and positioned to rest on said bracing strap, and truss bracing spanning said rim in said projecting portion to enhance the rigidity of said framework;

and means pivotally mounting each said framework at one end at the base of one of the forks adjacent the transport vehicle for pivotal mounting between an upper position to facilitate maneuverability of the transport vehicle and a lower extending horizontal position resting on the fork for simultaneous transportation of adjacent pallets.

2. In low-lift pallet trucks as set forth in claim 1 wherein said means for pivotally mounting each said fork extension framework includes a pair of fingers extending from the end of said framework adjacent the vehicle, plate means attached adjacent the base of the vehicle at the forks with two pairs of indentations, one pair on either side of each fork, for receiving the extending fingers of said frameworks, and support means attached across said rim of said framework to provide a pivot axis.

3. Fork extension apparatus for low-lift trucks of the type having a pair of forks at one end attached to a transporting vehicle and at the other end resting on rollers, said vehicle including lift means for raising the forks a small distance, said fork and lift means operative for raising a pallet into which the forks are inserted a small distance above the ground for transport, said fork extension apparatus comprising:

a pair of elongate frameworks each comprising a rim conforming in width to the outer perimeter of the forks and a portion of said frameworks projecting beyond the forks a length sufficient to raise two adjacent pallets, crossmeans spanning said rim and positioned to rest on said forks, truss bracing spanning said rim in said projecting portion of said framework to enhance the rigidity of said frameworks, each of said frameworks being of an open construction such that when said framework is in said extending horizontal position the plane of the pallet support surface of said fork is substantially parallel to the plane of the pallet support surface of said framework;

and means for pivotally mounting each said framework at one end adjacent the transport vehicle for pivotal movement between an upper position and a lower extending horizontal position resting on said forks for transportation of adjacent pallets simultaneously.

4. In low-lift truck vehicles as set forth in claim 1 wherein each of said frameworks is of an open construction such that when said framework is in said extending horizontal position the pallet support surface of said fork projects through said framework for engagingly supporting a pallet.

* * * * *